United States Patent
Smith et al.

(10) Patent No.: US 11,407,166 B2
(45) Date of Patent: Aug. 9, 2022

(54) ROBOTIC 3D GEOMETRY DIRECT-TO-SURFACE INKJET PRINTING CALIBRATION PROCESS

(71) Applicant: The Boeing Company, Chicago, IL (US)

(72) Inventors: Zachary R. Smith, Hanahan, SC (US); Anthony W. Baker, Gilbertsville, PA (US); Luke C. Ingram, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 499 days.

(21) Appl. No.: 16/588,468

(22) Filed: Sep. 30, 2019

(65) Prior Publication Data

US 2021/0094221 A1   Apr. 1, 2021

(51) Int. Cl.
| | | |
|---|---|---|
| *B41J 2/045* | (2006.01) | |
| *B41J 2/14* | (2006.01) | |
| *B41J 3/407* | (2006.01) | |
| *B29C 64/112* | (2017.01) | |
| *B29C 64/386* | (2017.01) | |

(52) U.S. Cl.
CPC .......... *B29C 64/112* (2017.08); *B29C 64/386* (2017.08); *B41J 2/04536* (2013.01); *B41J 2/04586* (2013.01); *B41J 2/14427* (2013.01); *B41J 3/4073* (2013.01)

(58) Field of Classification Search
CPC ................ B41J 2/04536; B41J 2/04586; B41J 2/14427; B41J 2/145; B41J 3/4073; B29C 64/112; B29C 64/386; G06K 15/027
See application file for complete search history.

(56) References Cited

U.S. PATENT DOCUMENTS

| | | | | |
|---|---|---|---|---|
| 2015/0306824 A1* | 10/2015 | Flores Mangas | ....... | G06F 30/00 700/98 |
| 2017/0188010 A1* | 6/2017 | Nezamabadi | .......... | G06T 7/521 |
| 2019/0158813 A1* | 5/2019 | Rowell | ............. | H04N 5/23267 |

* cited by examiner

*Primary Examiner* — Anh T Vo
(74) *Attorney, Agent, or Firm* — Alleman Hall Creasman & Tuttle LLP

(57) ABSTRACT

Methods of performing a rotational and translational calibrations of a print control system of an inkjet printer system having an inkjet printhead assembly with one or more inkjet printheads are disclosed. Rotational calibration is performed by printing a first rotational calibration pattern from a first standoff distance and a second rotational calibration pattern from a second standoff distance on a first calibration object. The print control system is calibrated until the rotational calibration patterns are within a direction difference tolerance of each other. Translational calibration is performed by printing a first translation calibration pattern on a second calibration object, rotating the inkjet printhead assembly 180°, and printing a second translational calibration pattern on the second calibration object. The print control system is calibrated until the translational calibration patterns are within a direction difference tolerance of each other.

20 Claims, 8 Drawing Sheets

ROBOTIC 3D GEOMETRY
DIRECT-TO-SURFACE INKJET PRINTING
CALIBRATION PROCESS

TECHNICAL FIELD

The present disclosure relates generally to inkjet printing and, more particularly, to calibration of robotic inkjet printing apparatuses for accurately printing patterns on components having three-dimensional (3D) surfaces.

BACKGROUND 3D surfaces of objects, such as component parts of aircraft for example, may have patterns printed on the surfaces by inkjet printhead assemblies mounted on robotic arms. In one example, a printhead assembly includes a printhead housing mounted on a robotic arm and having a plurality of inkjet printheads installed therein. Each inkjet printhead may dispense a different color ink, such as cyan, yellow, magenta and black. The printheads are controlled as the robotic arm moves the printhead assembly across the 3D surfaces to print the desired patterns in the desired colors on the 3D surfaces.

Because the inkjet printheads are mounted individually in the printhead housing, each inkjet printhead may be misaligned in any or a combination of six degrees of freedom relative to a tool center point (TCP) of the printhead assembly that can be determined using know techniques for determining the TCP of an end effector mounted on a robotic arm. Each inkjet printhead may be displaced linearly in X, Y or Z directions relative to a coordinate system centered on the TCP, and may have roll, pitch or yaw variations from the designed mounted positions of the inkjet printheads. These variations from the designed mounted positions must be corrected or taken into account in order to accurately print the pattern on the 3D surface. Physically repositioning the inkjet printheads within the printhead housing for proper alignment relative to the TCP is one option, but it may be difficult to make fine physical adjustments that may be necessary to align the inkjet printheads within tolerances necessary to accurately print the pattern. Alternatively, the inkjet printer system may be calibrated so that control of movement of the printhead assembly and discharge of ink from the inkjet printheads compensates for the misalignment of the inkjet printheads. Techniques exist for calibration of the TCP position and for inkjet printing on planar surfaces, but well defined processes for calibrating inkjet printheads relative to the TCP of the printhead assembly for printing on 3D surfaces are not presently known.

SUMMARY OF THE DISCLOSURE

In one aspect of the present disclosure, a method of performing a rotational calibration of a print control system of an inkjet printer system having an inkjet printhead assembly with a first inkjet printhead is disclosed. The method of performing the rotational calibration may include positioning a first calibration object at a first standoff distance from a TCP of the inkjet printhead assembly, causing the first inkjet printhead to print a first rotational calibration pattern on a first print surface of the first calibration object, positioning the first calibration object at a second standoff distance from the TCP of the inkjet printhead assembly and causing the first inkjet printhead to print a second rotational calibration pattern on the first print surface of the first calibration object. The method may further include determining a direction difference value between the first rotational calibration pattern and the second rotational calibration pattern, comparing the direction difference value to a direction difference tolerance for the inkjet printhead assembly, and calibrating the print control system to cause the first inkjet printhead to print the first rotational calibration pattern and the second rotational calibration pattern with the direction difference value less than the direction difference tolerance in response to determining that the direction difference value is greater than the direction difference tolerance.

In another aspect of the present disclosure, an inkjet printer system capable of performing a rotational calibration for accurately printing patterns on surfaces is disclosed. The inkjet printer system may include an inkjet printhead assembly having an inkjet printhead housing with a first inkjet printhead mounted thereto and a TCP, a motion system operatively connected to the inkjet printhead assembly and actuatable to move the inkjet printhead assembly, a print control system operatively connected to the inkjet printhead assembly and actuatable to cause the first inkjet printhead to discharge ink, a measurement system, and a controller operatively connected to the motion system, the print control system and the measurement system. The controller may be programmed to actuate the print control system to cause the first inkjet printhead to print a first rotational calibration pattern on a first print surface of a first calibration object disposed at a first standoff distance from the TCP, actuate the print control system to cause the first inkjet printhead to print a second rotational calibration pattern on the first print surface of the first calibration object when the first calibration object is disposed at a second standoff distance from the TCP, actuate the measurement system to determine a first direction difference value between the first rotational calibration pattern and the second rotational calibration pattern, and to compare the first direction difference value to a direction difference tolerance for the inkjet printhead assembly, and calibrate the print control system to cause the first inkjet printhead to print the first rotational calibration pattern and the second rotational calibration pattern with the first direction difference value less than the direction difference tolerance in response to determining that the first direction difference value is greater than the direction difference tolerance.

In a further aspect of the present disclosure, a method of performing a translational calibration of a print control system of an inkjet printer system having an inkjet printhead assembly with a first inkjet printhead is disclosed. The method of performing the translational calibration may include positioning a TCP of the inkjet printhead assembly at an initial position relative to a calibration object, causing the first inkjet printhead to print a first translational calibration pattern on a print surface of the calibration object, rotating the inkjet printhead assembly 180° about the TCP, and causing the first inkjet printhead to print a second translational calibration pattern on the print surface of the calibration object. The method may further include determining a first direction difference value between the first translational calibration pattern and the second translational calibration pattern printed by the first inkjet printhead, comparing the first direction difference value to a direction difference tolerance for the inkjet printhead assembly, and calibrating the print control system to cause the first inkjet printhead to print the first translational calibration pattern and the second translational calibration pattern with the first direction difference value less than the direction difference tolerance in response to determining that the first direction difference value is greater than the direction difference tolerance.

Additional aspects are defined by the claims of this patent.

DETAILED DESCRIPTION

Figure 1:
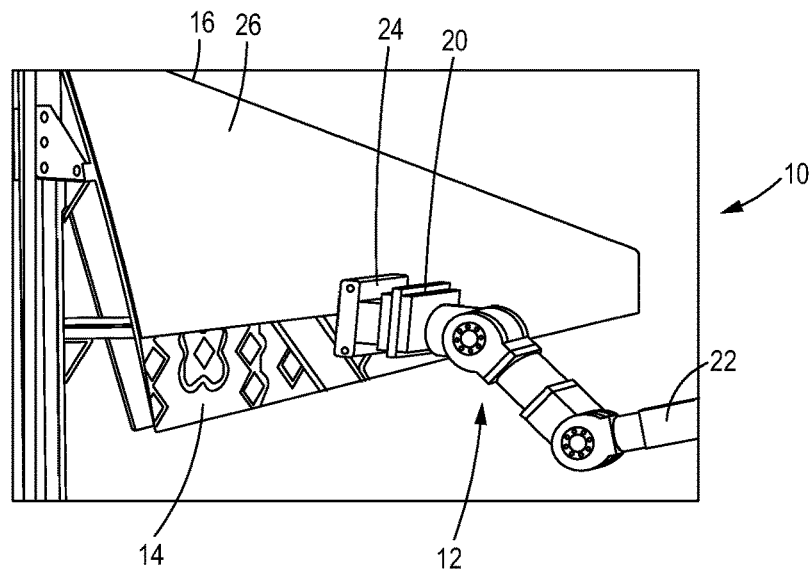
FIG. 1 is an isometric view of an exemplary inkjet printing workstation with a printhead assembly mounted on a robotic arm to print a pattern on a component having a 3D surface.

FIG. 1 illustrates an exemplary inkjet printing workstation 10 where an inkjet printer system 12 can print a pattern 14 on a component 16, such as a wing, a vertical or horizontal stabilizer, an engine housing, a portion of a fuselage or the like. Even though aircraft components are illustrated and discussed herein, those skilled in the art will understand that component 16 of other types of vehicles, products and equipment may have patterns such as the pattern 14 printed thereon at printing workstations 10 in accordance with the present disclosure. The inkjet printer system 12 includes an inkjet printhead assembly 20 mounted as an end effector on a robotic arm 22. The printhead assembly 20 as shown includes an inkjet printhead housing 24 in which one or more inkjet printheads (see FIGS. 2 and 3 and accompanying discussion below) are mounted for discharge of ink onto the component 16 to print the pattern 14.

The component 16 shown in FIG. 1 is an airfoil with a 3D surface 26 having curvature that must be considered when programming the inkjet printer system 12 to print the pattern 14. The component 16 at the printing workstation 10 may have 3D surfaces 26 with other contours that are more or less complex than the illustrated curved surface, and motion and print control systems will control the robotic arm 22 and the printhead assembly 20 to pass over the 3D surface 26 and discharge ink in a manner that will print the pattern 14. The calibration processes disclosed herein will enhance such control systems to improve the quality of the pattern 14 produced at the printing workstation 10.

Figure 2:
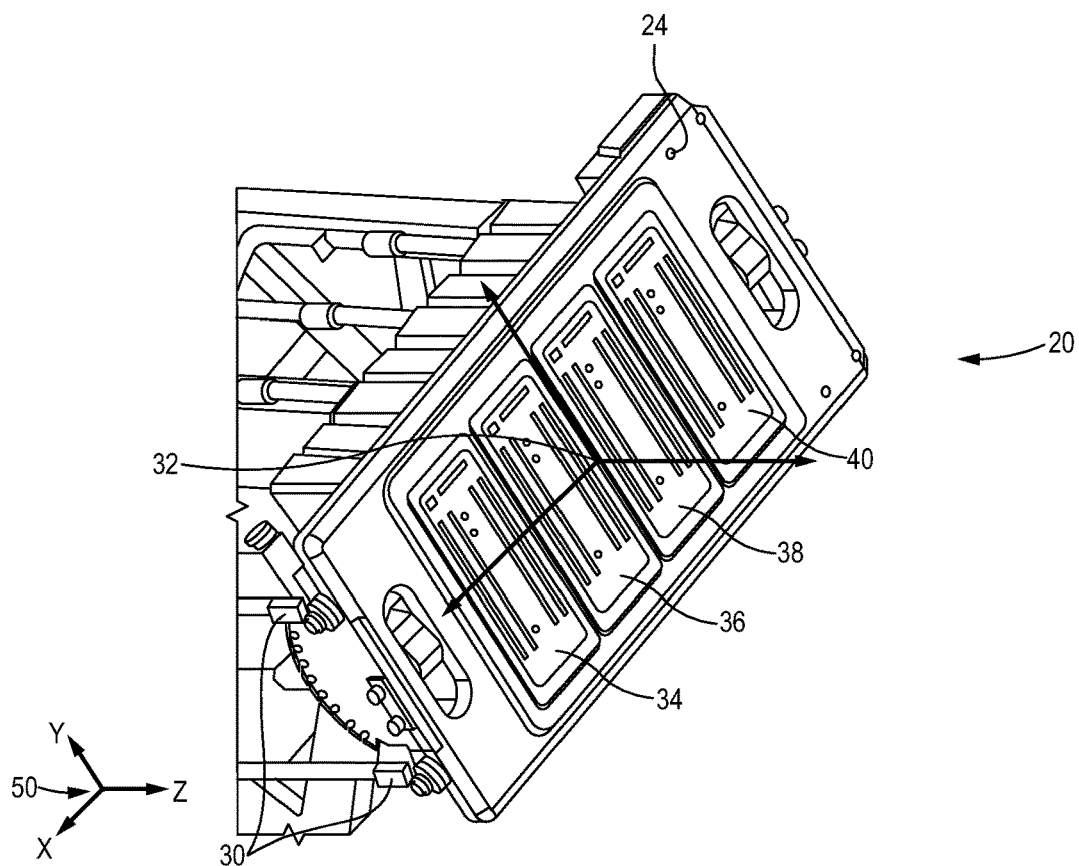
FIG. 2 is an isometric view of the printhead assembly of FIG. 1 with a coordinate system located at a TCP of the printhead assembly.

FIG. 2 illustrates the printhead assembly 20 in greater detail. The printhead housing 24 is mounted on the robotic arm 22 to move the printhead assembly 20 within the printing workstation 10 relative to the component 16. The printhead housing 24 may be mounted to an end of the robotic arm 22 by components 30 of a motion system that may facilitate movement of the printhead housing 24 relative to the robotic arm 22 for fine adjustment of the orientation of the printhead housing 24 relative to the 3D surface 26 of the component 16 as necessary to produce the pattern 14. Using known methods, a TCP 32 for the printhead assembly 20 is determined and used by the motion control system in maneuvering the printhead assembly 20 in the printing workstation 10 and around the component 16. The known methods include TCP calibration techniques to determine variations in the TCP 32 caused by variations in the actual size of the printhead housing 24 and the manner in which the printhead housing 24 is mounted to the robotic arm 22.

The printhead assembly 20 further includes a plurality of inkjet printheads 34, 36, 38, 40 that are mounted in the printhead housing 24. Each printhead 34, 36, 38, 40 may discharge a different color ink to produce a full color palette that may be used in printing the pattern 14. In the illustrated embodiment, the inkjet printheads include a cyan printhead 34, a yellow printhead 36, a magenta printhead 38 and a black printhead 40. This is a typical printhead arrangement where the printhead assembly 20 will pass over the 3D surface 26 in a normal print direction with the cyan printhead 34 at a leading end followed by the yellow printhead 36, the magenta printhead 38 and the black printhead 40 at a trailing end to discharge ink in color sequences to produce the colors of the pattern in a manner known in the art. Alternative color sequences and/or alternative base colors may be used depending on a particular implementation of the printhead assembly 20 in accordance with the present disclosure.

Figure 3:
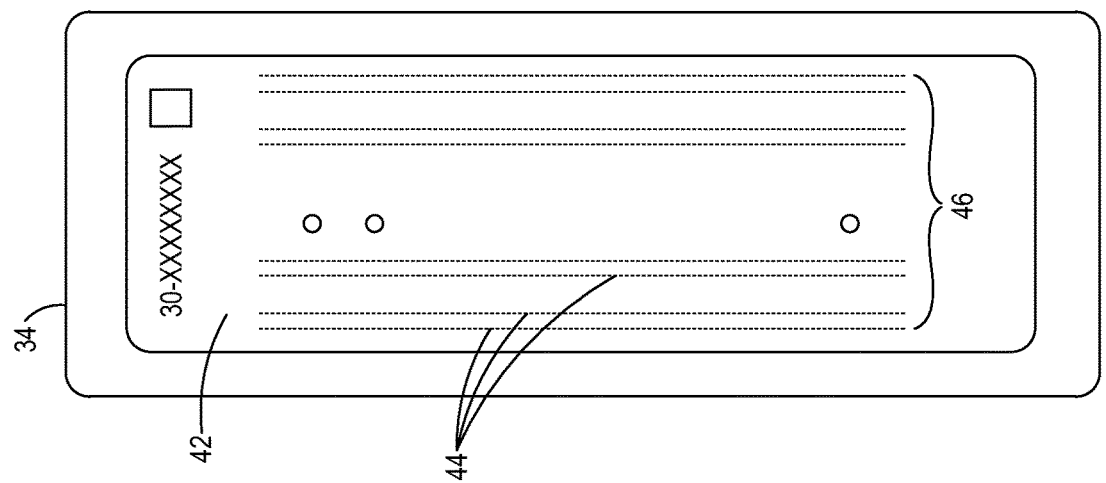
FIG. 3 is a front view of an exemplary inkjet printhead of the printhead assembly of FIG. 1.

FIG. 3 illustrates an example of a printhead printing surface 42 of the cyan printhead 34. The other printheads 36, 38, 40 have similar printhead printing surfaces 42. The printhead printing surface 42 may be generally planar and have a plurality of inkjet apertures or nozzles 44 passing there through from the interior of the cyan printhead 34 to the exterior of the printhead printing surface 42. The inkjet nozzles 44 may be arranged on the printhead printing surface 42 as necessary for complete ink coverage of a portion of a surface over which the printhead assembly 20 passes when moving in the print direction. In the illustrated embodiment, the inkjet nozzles 44 are arranged in a plurality of vertical columns 46 that are spaced across the printhead printing surface 42. Alternative arrangements of inkjet nozzles 44 contemplated, and the calibration techniques in accordance with the present disclosure will have equal applicability in such alternative arrangements. During printing, the print control hardware and software of the printhead assembly 20 controls the discharge of ink from subsets of the inkjet nozzles 44 of each printhead 34, 36, 38, 40 using known printing techniques as the printhead assembly 20 passes over the 3D surface 26 to apply each color in the appropriate locations to form the pattern 14 on the 3D surface 26.

Returning to FIG. 2, the TCP 32 serves as an origin for a 3D coordinate system 50 that is used to control the movement of the printhead assembly 20 and discharge of ink to print the pattern 14. In the exemplary TCP coordinate system 50, the X-axis corresponds to the side-to-side movement of the printhead housing 24 in the print direction. The positive X direction is in the direction of the printheads 34, 36, 38, 40 moving in a single file line with the cyan printhead 34 passing over the 3D surface 26 first. The Y-axis is in the up-and-down direction of movement of the printhead assembly 20, the Z-axis represents movement of the printhead assembly 20 toward and away from the component 16 normal to the 3D surface 26 being printed upon. The TCP coordinate system 50 also defines the rotational degrees of freedom of the printhead assembly 20 relative to the TCP 32. Roll of the printhead assembly 20 is rotation about the Z-axis, pitch is rotation about the X-axis, and yaw is rotation about the Y-axis. The motion control system of the printing workstation 10 will control the robotic arm 22 and the motion system components 30 to move the printhead assembly 20 in the X, Y and Z directions and with roll, pitch and yaw angles necessary to print the pattern 14 on the 3D surface 26.

Ideally, the printheads 34, 36, 38, 40 are mounted in the printhead housing 24 and aligned so that the ink from each inkjet nozzle 44 is discharge parallel to the X-axis and at prescribed distances in the X and Y directions from the TCP 32. If the printheads 34, 36, 38, 40 are accurately aligned within allowable tolerances, the motion control and print control systems can execute to cause the printhead assembly 20 to print the pattern 14 on the 3D surface 26. In practice, however, each printhead 34, 36, 38, 40 may not be perfectly aligned due to installation imprecision or errors, manufacturing inconsistencies and other factors. Consequently, misalignment of the printheads 34, 36, 38, 40 can occur in any of the six degrees of freedom (X, Y, Z, roll, pitch, yaw) or in multiple degrees of freedom. Physical realignment of the printheads 34, 36, 38, 40 may be possible, but in some applications precise alignment within design tolerances is not possible or is impractical. In such cases, calibration processes in accordance with the present disclosure can be implemented to determine alignment errors in the printheads 34, 36, 38, 40 and modify the print control software to compensate for the alignment errors when controlling the printhead assembly 20 to print the pattern 14 on the 3D surface 26.

Figure 4:
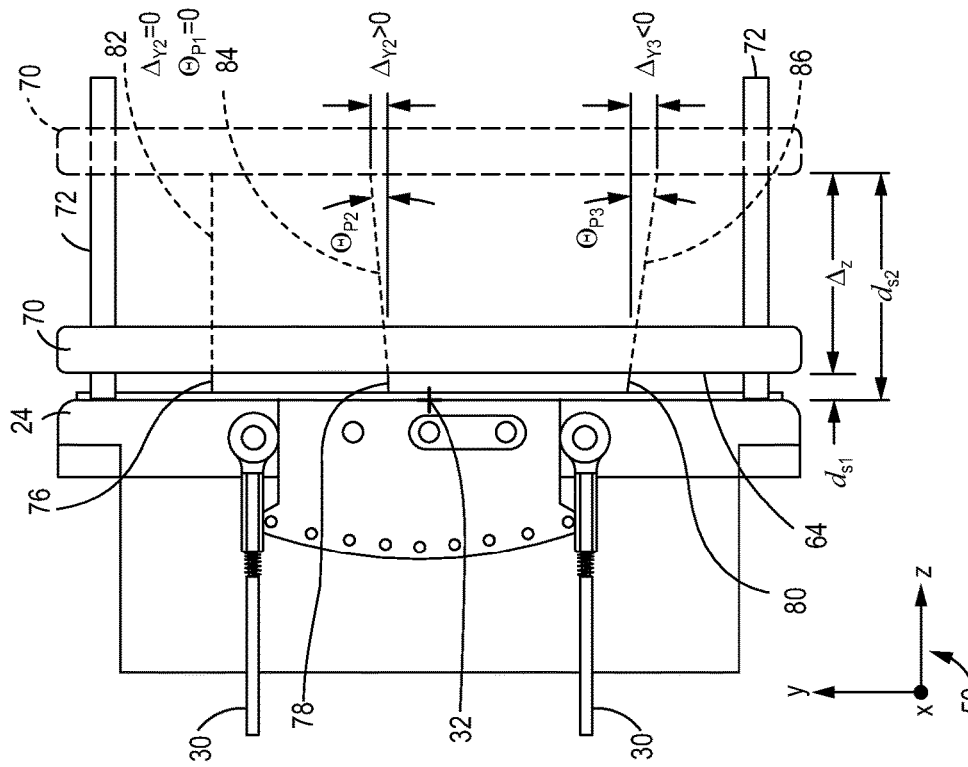
FIG. 4 is a side view of the printhead assembly of FIG. 1 with a first calibration object mounted thereon at first and second standoff distances from a printhead housing.
Figure 5:
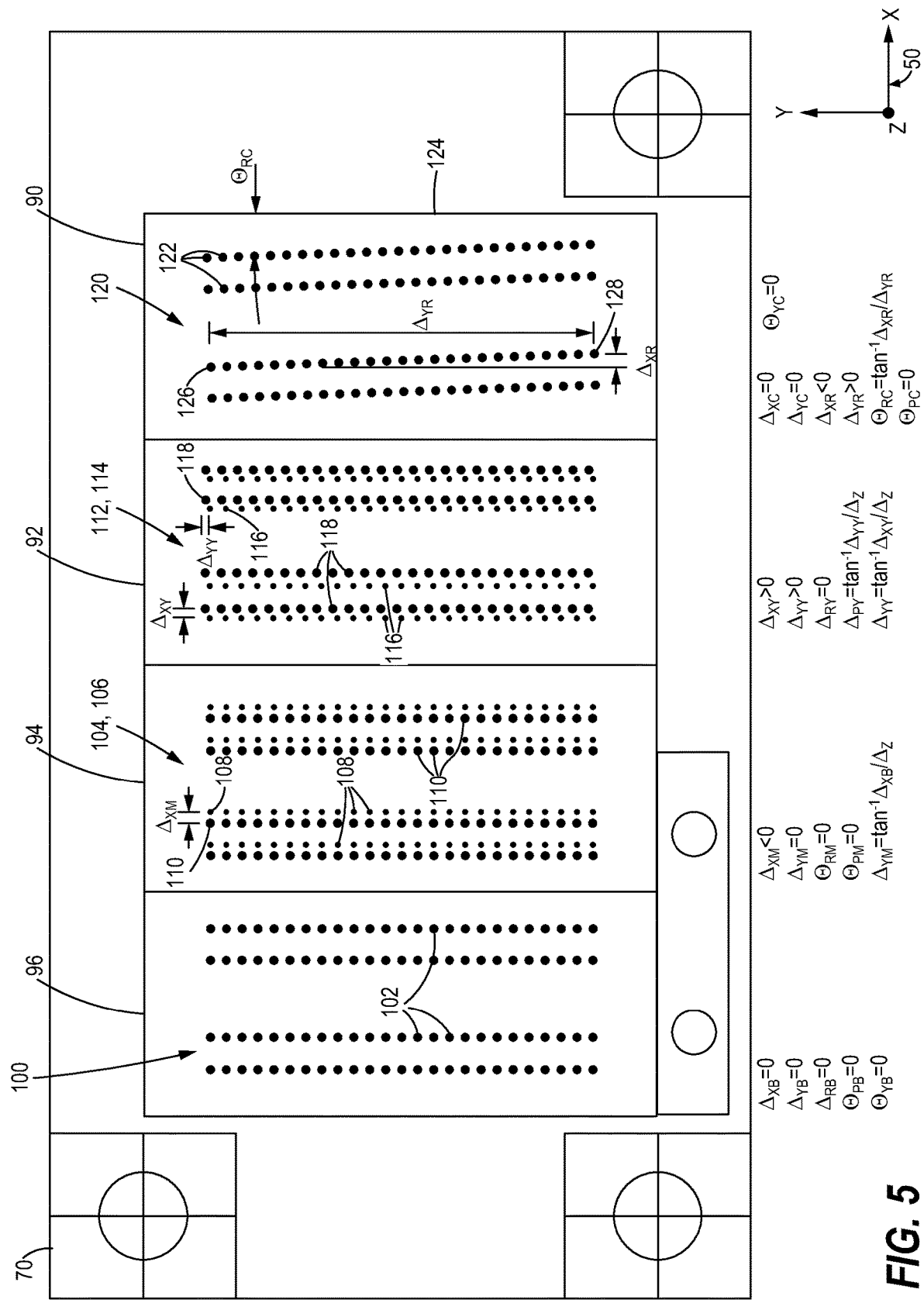
FIG. 5 is a front view of a print surface of the first calibration object of FIG. 4 after the inkjet printheads print rotational calibration patterns on the print surface when the first calibration object was disposed in the first and second standoff distances.

The calibration process in accordance with the present disclosure may include processes for rotational and translational calibration of the printhead assembly 20. FIGS. 4 and 5 illustrate a rotational calibration system where a first calibration object 70 is used to determine whether each of the printheads 34, 36, 38, 40 have roll, pitch and/or yaw angles relative to the TCP 32. This embodiment of the rotational calibration system entails discharging ink from a relevant subset of the inkjet nozzles 44 when the first calibration object 70 is disposed at different standoff distances ds in the Z direction from the printhead housing 24. Differences in the locations of ink dots on the first calibration object 70 from printing at the two standoff distances ds are used to determine roll, pitch and yaw angles for the printheads 34, 36, 38, 40 relative to the TCP 32.

Referring to FIG. 4, in one embodiment, the first calibration object 70 is mounted to the printhead housing 24 by a plurality of set screws 72 that are adjustable to vary the standoff distance ds in the Z direction of the first calibration object 70 from the TCP 32. The set screws 72 orient the first calibration object 70 so that a print surface 74 is perpendicular to the Z-axis and parallel to a plane defined by the X- and Y-axes of the TCP coordinate system 50. The first calibration object 70 is disposed at a first standoff distance $d_{S1}$ when first inkjet sprays 76, 78, 80 are discharged from corresponding inkjet nozzles 44 onto the print surface 74 to create first rotational calibration patterns. After the first discharge, the first calibration object 70 is moved by the set screws 72 to a second standoff distance $d_{S2}$ from the TCP 32 indicated by the dashed rendering of the first calibration object 70. When the first calibration object 70 is repositioned, second inkjet sprays 82, 84, 86 are discharged from the same inkjet nozzles 44 onto the first calibration object print surface 74 to create second rotational calibration patterns.

The use of the set screws 72 in positioning the first calibration object 70 relative to the TCP 32 is exemplary, and alternative configurations of the rotational calibration system are contemplated. For example, the first calibration object 70 may be mounted in a stationary position within the printing workstation 10, and the robotic arm 22 and the motion system components 30 may be actuated to position the printhead housing 24 relative to the first calibration object 70 at the first standoff distance $d_{S1}$ and the second standoff distance $d_{S2}$ without changing positions in the X and Y directions. In another alternative, the first calibration object 70 may be mounted on a device such as a further robotic arm that can position the first calibration object 70 at the first standoff distance $d_{S1}$ and the second standoff distance $d_{S2}$ while the robotic arm 22 holds the printhead housing 24 in a fixed position. Additional alternative mechanisms for controlling the positioning of the printhead housing 24 and the first calibration object 70 relative to each other will be apparent to those skilled in the art and are contemplated by the inventors as having use in rotational calibration systems in accordance with the present disclosure.

The locations of the first and second rotational calibration patterns on the print surface 74 will indicate whether each printhead 34, 36, 38, 40 has non-zero roll, pitch and/or yaw angles. The side view of FIG. 4 illustrates how variations in the pitch angles of the printheads 34, 36, 38, 40 are manifested on the print surface 74. The first inkjet spray 76 and the second inkjet spray 82 represent ink discharges by a first one of the printheads 34, 36, 38, 40 that are parallel to the Z-axis and therefore have a pitch angle $\Theta_{P1}$ that is equal to zero. The second inkjet spray 82 produces an ink dot at the same vertical location as the first inkjet spray 76 such that a first vertical difference $\Delta_{Y1}$ in the locations of the ink dots is equal to zero. With the first inkjet spray 78 and the second inkjet spray 84 from a second one of the printheads 34, 36, 38, 40, the second inkjet spray 84 impacts the print surface 74 above the location of the first inkjet spray 78. A second vertical difference $\Delta_{Y2}$ in the locations of the ink dots from the inkjet sprays 78, 84 is greater than zero (assuming upward is the positive Y direction) indicating that the corresponding inkjet printhead is rotated upward about the X-axis with a positive pitch angle $\Theta_{P2}$. The second vertical difference $\Delta_{Y2}$ may be measured by measurement systems known in the art. A horizontal difference $\Delta_Z$ in the Z direction is equal to the second standoff distance $d_{S2}$ minus the first standoff distance $d_{S1}$. Because the second vertical difference $\Delta_{Y2}$ and the horizontal difference $\Delta_Z$ are perpendicular to each other, the second vertical difference $\Delta_{Y2}$ divided by the horizontal difference $\Delta_Z$ is equal to the tangent of the second pitch angle $\Theta_{P2}$, and arctan $\Delta_{Y2}/\Delta_Z$ is equal to the second pitch angle $\Theta_{P2}$. The first inkjet spray 80 and the second inkjet spray 86 from a third one of the printheads 34, 36, 38, 40 illustrate a downward third pitch angle $\Theta_{P3}$ with a third vertical difference $\Delta_{Y3}$ between the ink dots created by the third inkjet sprays 80, 86, with arctan $\Delta_{Y3}/\Delta_Z$ being equal to the third pitch angle $\Theta_{P3}$. Looking downward from above the printhead housing 24 and the first calibration object 70 would illustrate yaw angles $\Theta_Y$ of the printheads 34, 36, 38, 40 in a similar manner.

FIG. 5 illustrates the print surface 74 of the first calibration object 70 after rotational calibration patterns have been printed at the first standoff distance $d_{S1}$ and the second standoff distance $d_{S2}$. The print surface 74 may be divided into print sections 90, 92, 94, 96, each corresponding to one of the printheads 34, 36, 38, 40. Consequently, a cyan print section 90 may align with the cyan printhead 34, a yellow print section 92 may correspond to the yellow printhead 36, a magenta print section 94 may correspond to the magenta printhead 38, and a black print section 96 may align with the black printhead 40. The various print sections 90, 92, 94, 96 illustrate different exemplary rotational orientations of the printheads 34, 36, 38, 40.

The ink dot patterns on the print sections 90, 92, 94, 96 are formed by discharging ink from a subset of the inkjet nozzles 44 to produce four vertical columns in ink dots in each print section 90, 92, 94, 96 when the printheads 34, 36, 38, 40 are aligned relative to the TCP 32 with no roll, pitch or yaw angles. The printhead 34, 36, 38, 40 is aligned if the corresponding print section 90, 92, 94, 96 has a single rotational calibration pattern of ink dots, meaning that the second rotational calibration pattern was printed on top of the first pattern. Two calibration patterns of ink dots, calibration patterns with non-vertical columns of ink dots, or combinations thereof, indicate misalignment rotation of the printheads 34, 36, 38, 40 relative to the TCP 32. Offsets of the ink dot patterns in the positive or negative X direction indicate yaw angles to the right or left, respectively. Offsets of the ink dot patterns in the positive or negative Y direction indicate up or down pitch angles, respectively. Rotation of the ink dot patterns in the clockwise or counterclockwise directions indicate roll angles about the Z-axis.

The black print section 96 in FIG. 5 illustrates a rotational calibration pattern 100 indicating that the black printhead 40 is properly aligned relative to the TCP 32. The inkjet nozzles 44 discharged inkjet sprays parallel to the Z-axis. Ink from the second inkjet sprays impacted the print surface 74 at the same locations as the first inkjet sprays. Consequently, each inkjet nozzle 44 produced a single ink dot 102 so that the black horizontal difference $\Delta_{XB}$ and the black vertical difference $\Delta_{YB}$ are equal to zero, and correspondingly a black yaw angle $\Theta_{YB}$ and a black pitch angle $\Theta_{PB}$, respectively, are equal to zero. Additionally, the columns of ink dots 102 are aligned vertically, indicating that a black roll angle $\Theta_{RB}$ is zero and the black printhead 40 is not rotated about the Z-axis.

The magenta print section 94 illustrates rotational calibration patterns 104, 106 where first ink dots 108 of the first rotational calibration pattern 104 and second ink dots 110 of the second rotational calibration pattern 106 are offset from each other in the X direction by a magenta horizontal difference $\Delta_{XM}$. The ink dots 108, 110 are distinguishable because greater dispersion occurs over the second standoff distance $d_{S2}$ than the first standoff distance $d_{S1}$ so that the second ink dots 110 are larger than the first ink dots 108. Therefore, the ink dot patterns 104, 106 indicate that the magenta printhead 38 has a magenta yaw angle $\Theta_{YM}$ to the left (i.e., away from the print direction) that is equal to arctan $\Delta_{XM}/\Delta_Z$. At the same time, the ink dots 108, 110 are aligned horizontally so that a magenta vertical difference $\Delta_{YM}$ and the magenta pitch angle $\Theta_{PM}$ are zero, and the columns of ink dot 108, 110 are aligned vertically so that a magenta roll angle $\Theta_{RM}$ of the magenta printhead 38 is zero.

In the yellow print section 92, rotational calibration patterns 112, 114 produced by the yellow printhead 36 are manifesting both yaw and pitch components of misalignment. A positive yellow horizontal difference $\Delta_{XY}$ between first ink dots 116 of the first rotational calibration pattern 112 and corresponding second ink dots 118 of the second rotational calibration pattern 114 indicates a yellow yaw angle $\Theta_{YY}$ to the right (i.e., into the print direction) and equal to arctan $\Delta_{XY}/\Delta_Z$. A positive yellow vertical difference $\Delta_{YY}$ between the first ink dots 116 and the corresponding second ink dots 118 indicates an upward yellow pitch angle $\Theta_{PY}$ equal to arctan $\Delta_{YY}/\Delta_Z$. As with the rotational calibration patterns 104, 106 in the magenta print section 94, the columns of the rotational calibration ink dot patterns 112, 114 are aligned vertically, so a yellow roll angle $\Theta_{RY}$ is equal to zero.

The cyan print section 90 has a single rotational calibration pattern 120 with ink dots 122 similar to the rotational calibration pattern 100 in the black print section 96. Consequently, a cyan horizontal difference $\Delta_{XC}$ and a cyan vertical difference $\Delta_{YC}$ are equal to zero, a cyan yaw angle $\Theta_{YC}$ and a cyan pitch angle $\Theta_{PC}$ are zero, and the cyan printhead 34 is properly aligned relative to the Y-axis and the X-axis, respectively. However, the rotational calibration pattern 120 is not vertically aligned and has a non-zero cyan roll angle $\Theta_{RC}$ relative to a vertical edge 124 defining the cyan print section 90. The cyan roll angle $\Theta_{RC}$ indicates counterclockwise rotation of the cyan printhead 34 about the Z-axis. The value of the cyan roll angle $\Theta_{RC}$ may be determined using any appropriate calculations that may be performed based information obtainable from the particular droplet measurement system implemented at the printing workstation 10. For example, measurements may be performed to obtain a roll horizontal difference $\Delta_{XR}$ and a roll vertical difference $\Delta_{YR}$ between a top ink dot 126 and a bottom ink dot 128 in one of the columns of ink dots 122. With these values, the cyan roll angle $\Theta_{RC}$ is equal to arctan $\Delta_{XR}/\Delta_{YR}$. Other measurement systems may be able to directly measure the cyan roll angle $\Theta_{RC}$ using one of the columns of ink dots 122 in the ink dot pattern 120 and the vertical edge 124 of the cyan print section 90. Other alternative methods for determining the cyan roll angle $\Theta_{RC}$ will be apparent to those in the art and are contemplated by the inventors.

If fine adjustment of the printheads 34, 36, 38, 40 within the printhead housing 24 is possible, the printheads 34, 36, 38, 40 may be rotated as necessary to zero out the roll, pitch and yaw angles $\Theta_R$, $\Theta_P$, $\Theta_Y$. Unfortunately, in most implementations, such adjustments are impractical or cost prohibitive. To eliminate the need for physical adjustments, calibration processes in accordance with the present disclosure such as those illustrated and described below utilize the values of the X and Y differences $\Delta_X$, $\Delta_Y$ and/or the roll, pitch and yaw angles $\Theta_R$, $\Theta_P$, $\Theta_Y$ determined from the print surface 74 of the first calibration object 70 as calibration data to adjust the motion and print control systems to discharge ink from the printheads 34, 36, 38, 40 in a manner that will accurately print the pattern 14 on the 3D surface 26.

The precise adjustments to the motion and print control systems will depend on the direction and magnitude of the roll, pitch and yaw angles $\Theta_R$, $\Theta_P$, $\Theta_Y$. For example, the magenta yaw angle $\Theta_{YM}$ in the magenta print section 94 will cause the magenta ink to hit the 3D surface 26 to the left of a target print location, or behind the target location as the printhead assembly 20 passes over the 3D surface 26 from left to right. One possible correction is for the print control system to delay discharging the magenta ink from the inkjet nozzles 44 until the magenta printhead 38 moves to a location where the corresponding inkjet nozzles 44 will hit the target location. The amount of time to delay discharging the magenta ink can be determined based on the magnitude of the magenta yaw angle $\Theta_{YM}$, the distance in the Z direction from the magenta printhead 38 to the target location on the 3D surface 26, and the rate of travel of the printhead assembly 20 over the 3D surface 26. Similarly, the print control system may compensate for the yellow yaw angle $\Theta_{YY}$ being to the right and into the print direction indicated by the ink dot patterns 112, 114 in the yellow print section 92 by discharging the yellow ink from the inkjet nozzles 44 of the yellow printhead 36 earlier than if the yellow printhead 36 was aligned with the Z-axis. In other implementations, depending on the arrangement of the inkjet nozzles 44 on the printing surface 42, the print control system may be adjusted to compensate for a yaw angle $\Theta_Y$ to the left or away from the print direction by discharging ink from inkjet nozzles 44 to the right of the usual inkjet nozzles 44, or to compensate for a yaw angle $\Theta_Y$ to the right or into the print direction by discharging ink from inkjet nozzles 44 to the left of the usual inkjet nozzles 44. Moreover, the calibration corrections to the print control system could be a combination of discharge timing and discharging inkjet nozzles 44 as necessary to accurately print the pattern 14 on the 3D surface 26.

The print control system may be calibrated to compensate for pitch angles $\Theta_P$ by adjusting which inkjet nozzles 44 will discharge ink to hit the target location. The upward yellow pitch angle $\Theta_{PY}$ causes ink to hit the print surface 74 above the target location. This error can be corrected by discharging ink from a lower inkjet nozzle 44 on the printing surface 42. The greater the pitch angle $\Theta_P$, the lower the correct inkjet nozzle 44 in the corresponding vertical column 46 will be to hit the target location. The pitch angle $\Theta_P$ and the Z distance to the print surface 74 may be used to determine the alternate inkjet nozzle 44 required to correct for the pitch angle $\Theta_P$. For downward pitch angles $\Theta_P$, the print control system can be calibrated to discharge ink from higher inkjet nozzles 44 in the corresponding vertical column 46 to hit the target location of the pattern 14.

Roll angles $\Theta_R$ such as the cyan roll angle $\Theta_{RC}$ present a more complex combination of printing deviations. Due to the rotation of the cyan printhead 34 about the Z-axis, each inkjet nozzle 44 will have printing error components in both the X direction and the Y direction. With the counterclockwise rotation of the cyan roll angle $\Theta_{RC}$, the inkjet nozzles 44 above the Z-axis will hit the 3D surface 26 to the left and below their corresponding target locations, while the inkjet nozzles 44 below the Z-axis will hit the 3D surface to the right and above their corresponding target locations. Moreover, the magnitude of the printing errors will be greater for the inkjet nozzles 44 that are farther from the Z-axis than those close to the Z-axis. Despite the added error complexity presented by the roll angles $\Theta_R$, the error at each inkjet nozzle 44 may be broken down into an X direction component and a Y direction component, with the calibrations for the print control system in the X direction being determined in a similar manner as the yaw angles $\Theta_Y$ and the calibrations in the Y direction being determined in a similar manner as the pitch angles $\Theta_P$ as discussed above. In alternative embodiments, the calibration adjustments may be calculated directly from the roll angle $\Theta_R$. In other alternatives, the print control system may be preprogrammed with lookup tables providing predetermined ink discharge calibrations for various values of X and Y differences $\Delta_X$, $\Delta_Y$ and/or the roll, pitch and yaw angles $\Theta_R$, $\Theta_P$, $\Theta_Y$ that may be used to calibrate the print control system without the need to perform real-time calibration calculations. Further alternative calibration adjustment strategies are contemplated.

Figure 6:
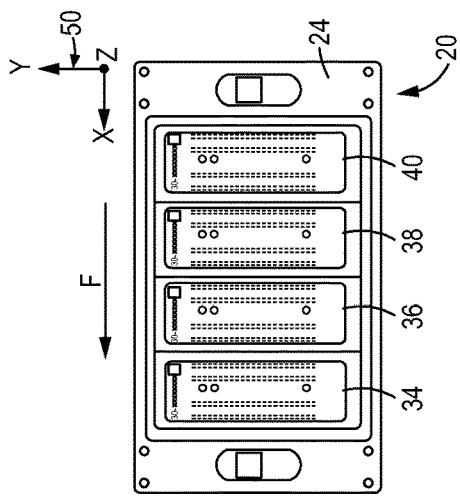
FIG. 6 is a front view of the printhead assembly of FIG. 1 in a first position and a rear view of a second calibration object before the printhead assembly makes a first printing pass over the print surface of the second calibration object in a forward print direction.
Figure 6:
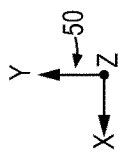
Figure 6:
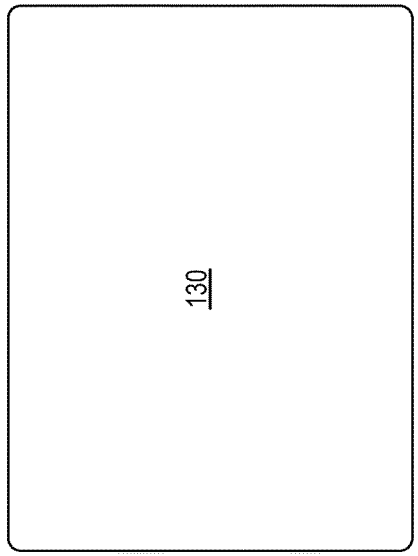
Figure 7:
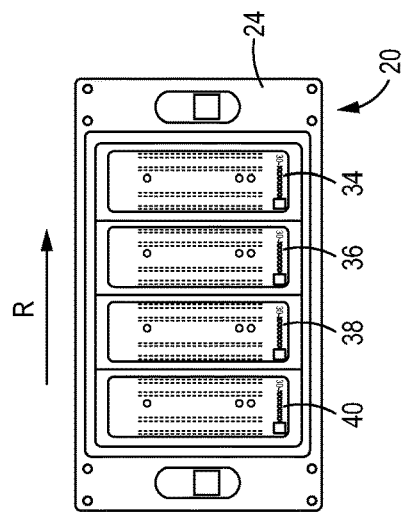
FIG. 7 is a front view of the printhead assembly of FIG. 1 after a 180° roll rotation and the rear view of the second calibration object before the printhead assembly makes a second printing pass over the print surface of the second calibration object in a reverse print direction.
Figure 8:
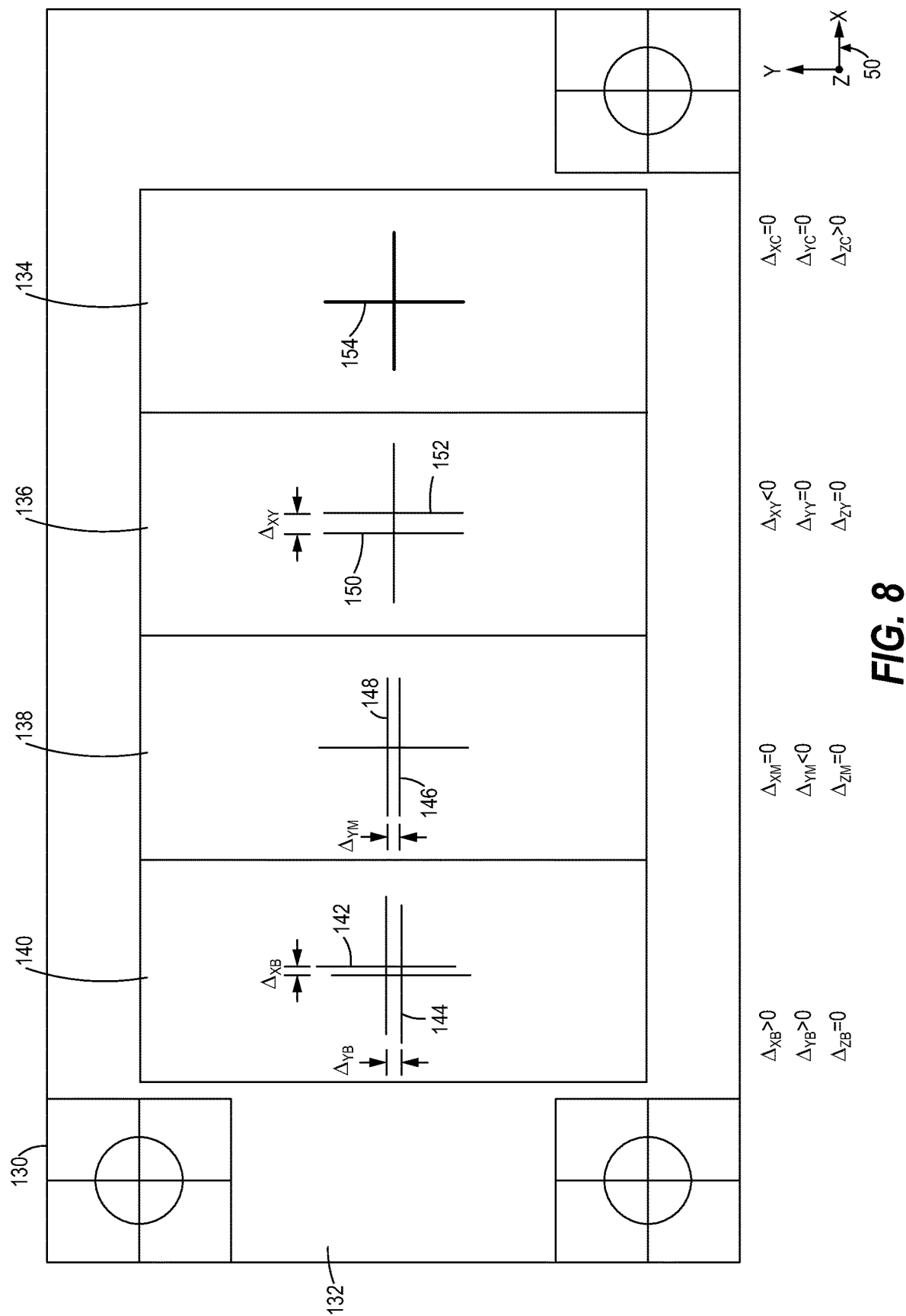
FIG. 8 is a front view of the print surface of the second calibration object of FIG. 6 after the inkjet printheads print translational calibration patterns on the print surface during the first and second printing passes over the print surface.

After the rotational calibrations are performed and the print control system is calibrated to adjust for the roll, pitch and yaw angles $\Theta_R$, $\Theta_P$, $\Theta_Y$, a translational calibration routine may be performed to determine if the printheads 34, 36, 38, 40 are translationally aligned in the X, Y and Z directions within the TCP coordinate system 50. The printing steps of the translational calibration routine are illustrated in FIGS. 6 and 7. Referring to FIG. 6, the printhead housing 24 is positioned adjacent a second calibration object 130 prior to a first printing pass over the second calibration object 130 in the normal forward print direction indicated by arrow F. The second calibration object 130 will be held stationary within the printing workstation 10 while the printhead assembly 20 makes two printing passes as described herein. The printhead housing 24 is oriented in the normal printing position with the cyan printhead 34 at the leading end and the black printhead 40 at the trailing end. In the first printing pass over the second calibration object 130, each of the printheads 34, 36, 38, 40 prints a translational calibration pattern on a second calibration object print surface 132 (FIG. 8). The TCP 32 of the printhead housing 24 is positioned at a prescribed calibration height along the Y-axis and a prescribed distance from the print surface 132 along the Z-axis. After the first printing pass, the printhead housing 24 is rotated 180° about the Z-axis prior to a second printing pass over the second calibration object 130 in the reverse print direction indicated by arrow R in FIG. 7. In this position, the printheads 34, 36, 38, 40 are rotated 180° and the cyan printhead 34 is at the leading end of the reverse print direction R. With the printhead housing 24 reoriented, a second printing pass is made over the print surface 132 in the reverse direction with each printhead 34, 36, 38, 40 printing the same translational calibration pattern on the same portion of the print surface 132 as in the first printing pass. In alternative embodiments, the printhead housing 24 may be repositioned to the X, Y, Z coordinates of FIG. 6 after the first printing pass, rotated 180°, and then controlled to move in the forward direction to make the second printing pass with the black printhead 40 at the leading end.

FIG. 8 illustrates the print surface 132 of the second calibration object 130 after the translational calibration patterns have been printed in the first and second printing passes. Similar to the print surface 74, the print surface 132 may be divided into print sections 134, 136, 138, 140, each corresponding to one of the printheads 34, 36, 38, 40. Consequently, the cyan printhead 34 prints a cyan calibration pattern on a cyan print section 134, a yellow print section 136 may correspond to the yellow printhead 36, a magenta print section 138 may correspond to the magenta printhead 38, and the black printhead 40 prints a black calibration pattern on a black print section 140. The various print sections 134, 136, 138, 140 illustrate different exemplary translational positions of the printheads 34, 36, 38, 40.

In the illustrated embodiment, each of the printheads 34, 36, 38, 40 prints a translational calibration pattern during each printing pass within the corresponding print section 134, 136, 138, 140. The translational calibration patterns are crosshairs having a vertical line and a horizontal line, but alternative calibration patterns may be used that facilitate detection of translational misalignments of the printheads 34, 36, 38, 40. Because rotational calibration of the print control system was previously performed, the horizontal line should be parallel to the X-axis and the vertical line should be parallel the Y-axis. The translational calibration patterns in each print section 134, 136, 138, 140 will be aligned and printed on top of each other if the corresponding printhead 34, 36, 38, 40 is aligned with the TCP 32 in the X and Y directions. Translational misalignment of the printheads 34, 36, 38, 40 is indicated where the second translational calibration pattern is not aligned with and does not cover the first translational calibration pattern. Horizontal offset of the translational calibration patterns within a print section 134, 136, 138, 140 indicates X-axis misalignment of the corresponding printhead 34, 36, 38, 40, and vertical offset of the translational calibration patterns indicates Y-axis misalignment. Z-axis misalignment will be indicated by the thickness of the lines of the translational calibration patterns as discussed further below.

The black print section 140 in FIG. 8 illustrates a first translational calibration pattern or crosshair 142 printed during the first or forward printing pass, and a second translational calibration pattern or crosshair 144 printed during the second or reverse printing pass that are offset from each other both horizontally and vertically. In order to determine the directions of misalignment of the black printhead 40, it is necessary to distinguish between the first crosshair 142 and the second crosshair 144. In one implementation of a translational calibration strategy in accordance with the present disclosure, the measurement system may take a first image of the first crosshair 142 after the forward printing pass to establish the location of the first crosshair 142 in the black print section 140, and may take a second image of the first crosshair 142 and the second crosshair 144 after the reverse printing pass. The measurement system can then compare the images and determine that the first crosshair 142 printed above and to the right of the second crosshair 144.

The position of the first crosshair 142 to the right of the second crosshair 144 indicates that the black printhead 40 is misaligned to the right in the positive X direction. The result is similar to a positive yaw angle $\Theta_Y$ as described above where the black printhead 40 discharges the black ink too late and hits the black print section 140 to the right of the target location. The misalignment can similarly be corrected either by discharging the black ink from the black printhead 40 earlier, by discharging the black ink from an inkjet nozzle 44 to the left of the normal inkjet nozzle 44, or a combination of those solutions. The magnitude of the early discharge or shift of inkjet nozzles 44 to the left is dictated by the black X direction difference $\Delta_{XB}$ between the vertical lines of the crosshairs 142, 144 and the rate of travel of the printhead assembly 20. However, it must be noted that the value of the black X direction difference $\Delta_{XB}$ is twice the distance of the misalignment of the black printhead 40 because the first black crosshair 142 was printed to the right of the target location by distance of the misalignment and the second black crosshair 144 was printed to the left of the target location by the same misalignment distance after the 180 rotation of the printhead housing 24. In view of this, the calibration of the print control system will use one-half of the black X direction difference $\Delta_{XB}$ in adjusting the black ink discharge to the left.

The printing of the first crosshair 142 above the second crosshair 144 indicates that the black printhead 40 is misaligned upward in the positive Y direction similar to an upward pitch angle $\Theta_P$ where the discharged black ink hits the black print section 140 above the target location. The positive Y direction misalignment can be corrected by shifting the discharge of the black ink downward to lower inkjet nozzles 44 in the corresponding vertical column 46. Similar to the X direction misalignment, the value of the black Y direction difference $\Delta_{YB}$ is twice the distance of the misalignment of black printhead 40 due to the printing of the second black crosshair 144 after the printhead housing 24 is rotated by 180°. Consequently, the calibration of the print control system will use one-half of the black Y direction difference $\Delta_{YB}$ to adjust the black ink discharge downward.

The yellow print section 136 and the magenta print section 138 illustrate Y direction and X direction printhead misalignments, respectively, in the opposite directions as the black printhead 40 discussed above. The magenta print section 138 has a first translational calibration pattern or crosshair 146 that is aligned with a second translational calibration pattern or crosshair 148 in the X direction, but is printed below the second crosshair 148. The magenta printhead 38 is shifted downward by one half of a magenta Y direction difference $\Delta_{YM}$ and the print control system will be calibrated to discharge magenta ink from inkjet nozzles 44 above the original inkjet nozzles 44 in the corresponding vertical columns 46. The yellow print section 136 has a first translational calibration pattern or crosshair 150 that is aligned with a second translational calibration pattern or crosshair 152 in the Y direction, but is printed to the left of the second crosshair 152. The yellow printhead 36 is shifted to the left by one half of a yellow X direction difference $\Delta_{XM}$ and the print control system will be calibrated to delay the discharge yellow ink from inkjet nozzles 44, to discharge yellow ink from inkjet nozzles to the right of the original inkjet nozzles 44, or a combination thereof as may be necessary.

In the cyan print section 134, translational calibration patterns or crosshairs 154 are aligned in both the X direction and the Y direction such that the cyan printhead 34 is aligned with the X- and Y-axes and a cyan X direction difference $\Delta_{XC}$ and a cyan Y direction difference $\Delta_{YC}$ are equal to zero so no calibration is required in those directions. However, the cyan crosshairs 154 are thicker than the crosshairs in the other print sections 136, 138, 140. As discussed above in regards to the ink dots 108, 110 on the print surface 74 of the first calibration object 70t, greater dispersion of discharged ink occurs as the distance from the inkjet nozzles 44 to the print surface 132 increases. Therefore, the thicker cyan crosshairs 154 indicate that the cyan printhead 34 is misaligned in the negative Z direction and farther from the print surface 132. The measurement system can detect the width of the lines of the cyan crosshairs 154 to determine the magnitude of a cyan Z direction difference $\Delta_{ZC}$. One strategy to compensate for the increased discharge distance is discharging the cyan ink at a higher pressure so that the ink has less dispersion prior to impacting the print surface 132. The amount of the discharge pressure increase is such that the cyan printhead 34 will print the cyan crosshairs 154 with the desired line widths at the increased discharge distance. Conversely, where the cyan crosshairs 154 are printed with narrower lines indicating that the cyan printhead 34 is closer to the print surface 132, the print control system can be calibrated to decrease the discharge pressure and thereby increase the ink dispersion and thickness of the lines in the cyan crosshairs 154.

Figure 9:
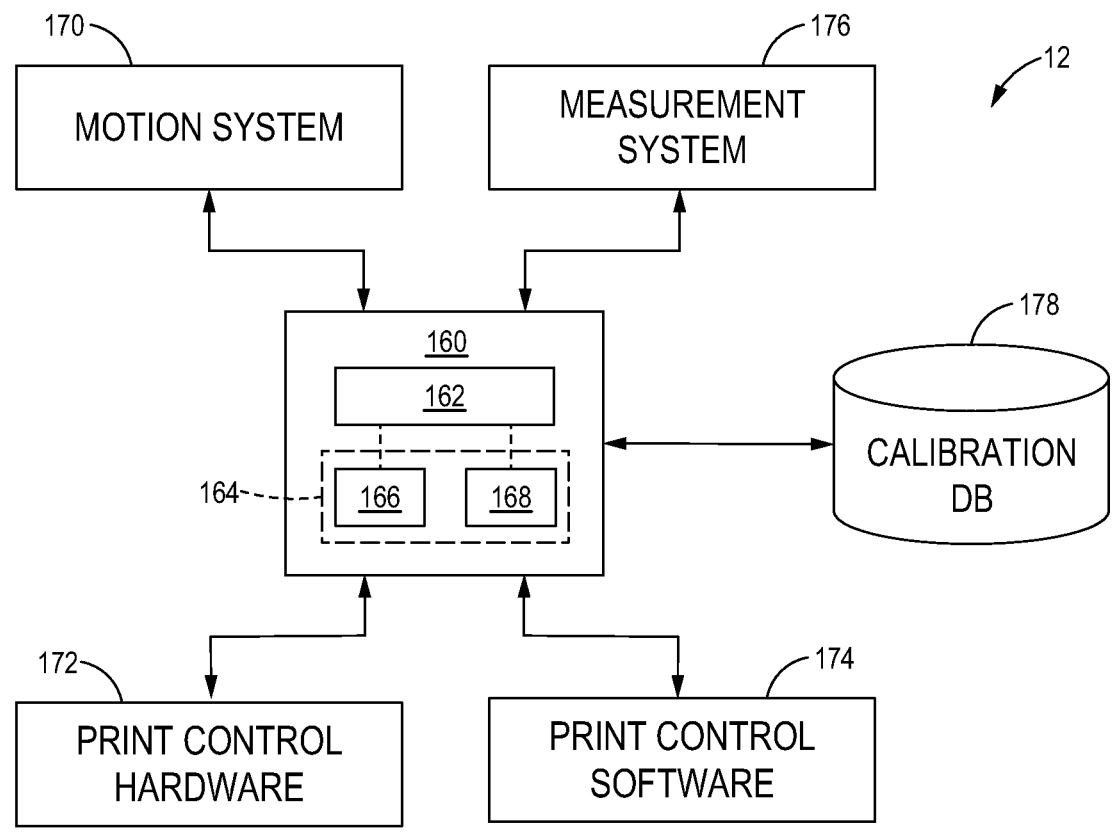
FIG. 9 is a block diagram of electrical and control components of the inkjet printer system of FIG. 1 that may implement inkjet printing calibration in accordance with the present disclosure.

The rotational and translational calibration strategies illustrated and described herein may be integrated into the inkjet printer system 12 to compensate for misalignment of each of the printheads 34, 36, 38, 40 so that the printhead assembly 20 will accurately print the pattern 14 on the 3D surface 26 of the component 16. FIG. 9 illustrates an exemplary arrangement of electrical and control components that may be integrated in the inkjet printer system 12 and are capable of implementing printhead calibration strategies. A controller 160 may be capable of processing information received from monitoring and control devices using software stored at the controller 160, and outputting command and control signals to devices of the inkjet printer system 12. The controller 160 may include a processor 162 for executing a specified program, which controls and monitors various functions associated with the inkjet printer system 12. The processor 162 may be operatively connected to a memory 164 that may have a read only memory (ROM) 166 for storing programs, and a random access memory (RAM) 168 serving as a working memory area for use in executing a program stored in the ROM 166. Although the processor 162 is shown, it is also possible and contemplated to use other electronic components such as a microcontroller, an application specific integrated circuit (ASIC) chip, or any other integrated circuit device.

While the discussion provided herein relates to the functionality of the inkjet printer system 12, the controller 160 may be configured to control other aspects of operation of other systems, including other inkjet printer systems 12 at other printing workstations 10. Moreover, the controller 160 may refer collectively to multiple control and processing devices across which the functionality of the inkjet printer system 12 and other systems may be distributed. Portions of the functionality of the inkjet printer system 12 may be performed at a controller of a remote computing device (not shown) that is operatively connected to the controller 160 by a communication link. The controllers may be operatively connected to exchange information as necessary to control the operation of the inkjet printer system 12. Other variations in consolidating and distributing the processing of the controller 160 as described herein are contemplated as having use in inkjet printer systems 12 in accordance with the present disclosure.

The illustrated inkjet printer system 12 includes a motion system 170 that executes movements of the printhead assembly 20 within the printing workstation 10 and around the component 16 on which the pattern 14 is being printed. The motion system 170 may include the motors and other actuation mechanisms of the robotic arm 22 that cause movement of the robotic arm 22 to move the TCP 32 to locations that are input manually by an operator at an appropriate input mechanism such as a joystick, mouse, keyboard, touch screen or the like (not shown). The motion system 170 may also receive control signals from the controller 160 with instructions to cause the robotic arm 22 to move the printhead assembly 20 through a programmed printing path or route over the 3D surface 26 so that the printhead assembly 20 can print the pattern 14. The motion system 170 may further include the motion system components 30 and corresponding actuators that articulate the printhead assembly 20 relative to the robotic arm 22 for fine adjustment of the orientation of the printhead housing 24 relative to the 3D surface 26 of the component 16 as necessary to produce the pattern 14.

A print control system composed of print control hardware 172 and print control software 174 facilitates and controls the discharge of ink from the printheads 34, 36, 38, 40 at locations and timing to print the pattern 14 on the 3D surface 26. The print control hardware 172 can include pumps, valves and other flow control devices that can cause the transfer of ink from a cartridge or other ink reservoir to the inkjet nozzles 44 of the corresponding printhead 34, 36, 38, 40 for discharge onto the 3D surface 26. The controller 160 may transmit control signals to actuators of the print control hardware 172 to cause the discharge of ink. Sensing devices such as pressure sensors, flow sensors, accelerometers and the like may transmit sensor signals back to the controller 160 with information regarding the operating conditions within the printhead assembly 20, the orientation of the printhead housing 24 and other factors relevant to the operation of the printhead assembly 20 to print the pattern 14 on the 3D surface 26.

The print control software 174 may be executed by the controller 160 to control the movement of the printhead assembly 20 and the discharge of ink from the printheads 34, 36, 38, 40. The print control software 174 may be programmed with a printing path or route through which the robotic arm 22 and motion system components move the printhead assembly 20 over the 3D surface 26, and with an inkjet discharge sequence for the printheads 34, 36, 38, 40 to discharge ink and print the pattern 14 as the printhead assembly 20 passes over the 3D surface 26. The print control software 174 may be configured with calibration functionality for implementing the rotational and translational strategies discussed herein so that the discharge sequences can be modified as necessary to compensate for misalignment of the printheads 34, 36, 38, 40 as discussed herein.

The inkjet printer system 12 may further include an ink droplet measurement system 176 that is capable of detecting the calibration patterns printed on the print surfaces 74, 132 and analyzing the detected images to determine rotational and translational misalignments of the printheads 34, 36, 38, 40. The measurement system 176 may include the capability to determine distances between ink dots, crosshair lines and other reference indicia on the print surface 74, 132, and determine ink dot diameters, line widths and other relevant dimensions of the calibration process. The controller 160 may transmit control signals to cause the measurement system 176 to execute the detection and dimensional analysis operations on the calibration patterns. The measurement system 176 may be configured to transmit measurement data signals back to the controller 160 containing the collected measurement data for use in calibrating the print control software 174 as discussed herein.

The information retuned from the measurement system 176 may be transmitted to and stored in a calibration database 178 that may be part of the print control system and operatively connected to the controller 160. The calibration database 178 may contain the measurement data provided by the measurement system 176 and other information relevant to calibrating the print control software 174. For example, the raw measurement data may be supplemented with derived data such as the distance differences $\Delta_X$, $\Delta_Y$, $\Delta_Z$ and roll, pitch and yaw angles $\Theta_R$, $\Theta_P$, $\Theta_Y$, as well as any additional data required to make the calibration adjustments to the discharge of ink from the printheads 34, 36, 38, 40 discussed herein.

INDUSTRIAL APPLICABILITY

Figure 10:
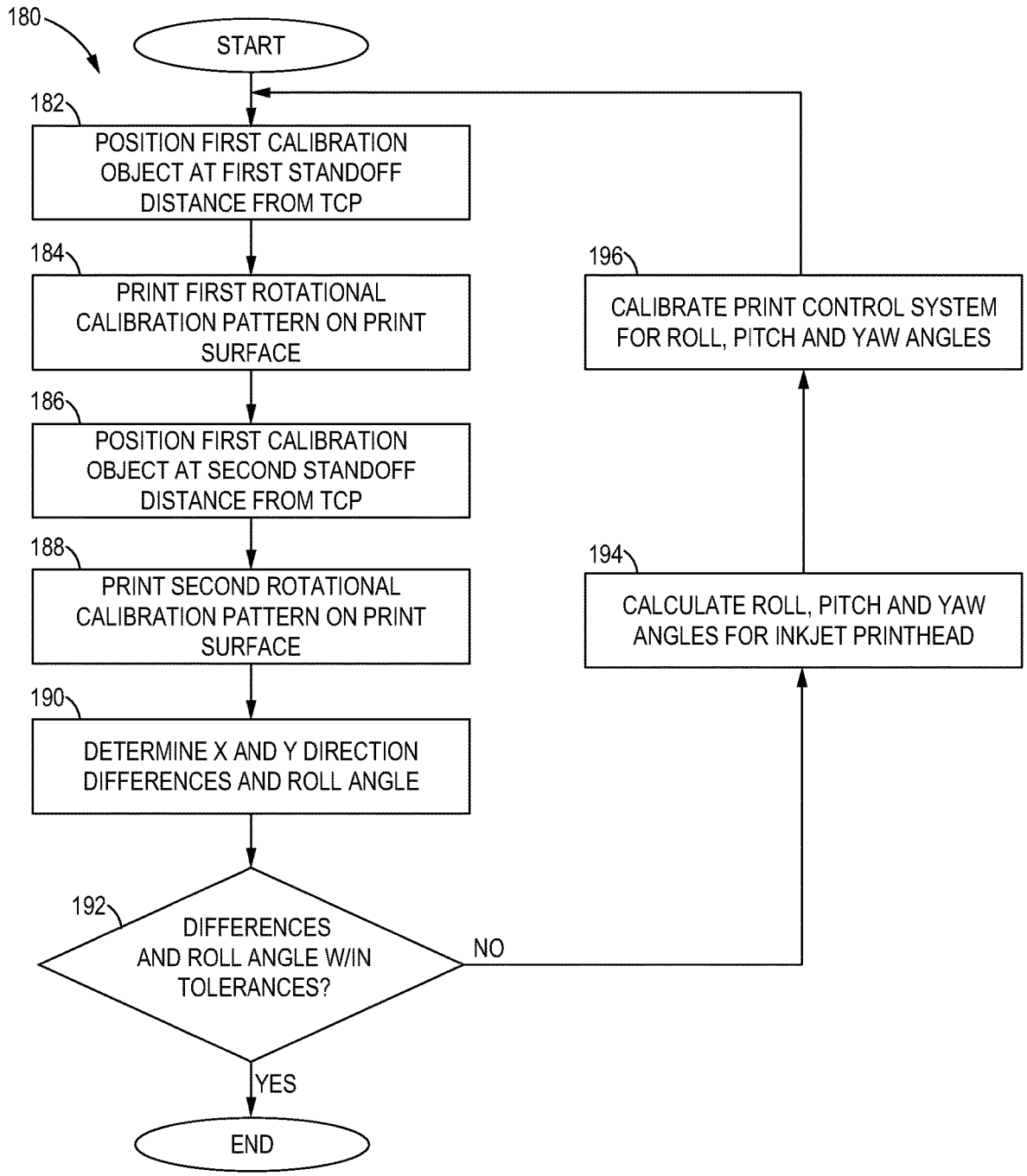
FIG. 10 is a flow diagram of a rotational calibration routine for the inkjet printer system of FIG. 1.

The electrical and control components of the inkjet printer system 12 discussed above may be use to execute rotational and translational calibration strategies in accordance with the present disclosure. FIG. 10 illustrates an exemplary rotational calibration routine 180 that can be performed to compensate for roll, pitch and yaw angles $\Theta_R$, $\Theta_P$, $\Theta_Y$ in each of the printheads 34, 36, 38, 40 relative to the TCP coordinate system 50. The rotational calibration routine 180 may be programmed functionality of the print control software 174 that is executed by the controller 160. The rotational calibration routine 180 may begin at a block 182 where the first calibration object 70 is positioned at the first standoff distance $d_{S1}$ from the TCP 32 in the Z direction. The first calibration object 70 can be mounted to the printhead housing 24 and positioned using the set screws 72 as illustrated above. Alternatively, the first calibration object 70 may be mounted in a fixed position and the controller 160 can transmit control signals to cause the motion system 170 to move the printhead housing 24 to the first standoff distance $d_{S1}$ and aligned with the print surface 74.

With the first calibration object 70 in position, control may pass to a block 184 where a first rotational calibration pattern is printed on the print surface 74 by the printhead assembly 20. The controller 160 may transmit print control signals to the print control hardware 172 to cause each of the printheads 34, 36, 38, 40 to print a rotational calibration pattern such as the ink dot patterns illustrated and described in relation to FIG. 5. After printing the rotational calibration patterns on the print surface 74, control passes to a block 186 where the first calibration object 70 is repositioned to the second standoff distance ds relative to the TCP 32. Repositioning is performed by moving the first calibration object 70 relative to the printhead housing 24, such as by adjusting the set screws 72, or by moving the printhead housing 24 relative to the first calibration object 70, such as by transmitting control signals from the controller 160 to the motion system 170. To avoid adding further variables to the calibration process, the X and Y positions of the first calibration object 70 relative to the TCP 32 are maintained. After repositioning the first calibration object 70, control passes to a block 188 the controller 160 transmits print control signals to the print control hardware 172 to cause each of the printheads 34, 36, 38, 40 to print a second rotational calibration pattern on the print surface 74.

With the first and second calibration patterns printed on the prints surface 74 by each of the printheads 34, 36, 38, 40, differences in the positions of the rotational calibration patterns are used to determine whether adjustments to the print control software are necessary to produce the pattern 14. Control may pass to a block 190 where X and Y direction differences $\Delta_X x$, $\Delta_Y y$ and roll angles $\Theta_R$ between the first and second rotational calibration patterns are determined. The controller 160 may transmit control signals to cause the measurement system 176 to detect the rotational calibration patterns and determine differences in their positions such as those described previously in relation to FIG. 5. With regard to roll angles $\Theta_R$, the measurement system 176 may determine the X and Y direction differences $\Delta_X$, $\Delta_Y$ without the additional step of calculating values of the roll angles $\Theta_R$ to reduce processing time and resources required in the event that one or more of the printheads 34, 36, 38, 40 does not have a roll angle $\Theta_R$ requiring recalibration of the print control software 174. The values determined by the measurement system 176 may be transmitted back to the controller 160 for evaluation and storage in the calibration database 178.

The values of the X and Y direction differences $\Delta_X$, $\Delta_Y$ and the roll angles $\Theta_R$ determined by the measurement system 176 are compared to corresponding tolerances at a block 192. Minor amounts of misalignment of the printheads 34, 36, 38, 40 may be acceptable if they do not result in perceptible distortion of the pattern 14 when printed on the component 16. For example, designs painted onto an automobile body may be require fine precision so that the images are sharp when the art on the body is closely inspected. In contrast, an airline's livery pattern painted on an aircraft fuselage can tolerate less precision as the aircraft is normally viewed from a distance. Consequently, tolerances for varying levels of precision may be stored in the calibration database 178, with the appropriate tolerance values being selected by the print control software 174 and used in the comparisons based on the precision required for a particular painting application. If the values of the X and Y direction differences $\Delta_X$, $\Delta_Y$ and the roll angles $\Theta_R$ determined by the measurement system 176 are within the corresponding tolerances for the painting application programmed into the print control software 174, the print control software 174 is sufficiently calibrated to print the pattern 14 on the 3D surface 26 and the rotational calibration routine 180 terminates.

If any of the values of the X and Y direction differences $\Delta_X$, $\Delta_Y$ and the roll angles $\Theta_R$ determined by the measurement system 176 are not within the corresponding tolerances for the painting application when the comparison is made, control may pass to a block 194 where the controller 160 may calculate the values for the roll, pitch and yaw angles $\Theta_R$, $\Theta_P$, $\Theta_Y$ for each of the printheads 34, 36, 38, 40 that are not within tolerance if necessary to execute the calibration of the printhead 34, 36, 38, 40. In some implementations, the values of the angles $\Theta_R$, $\Theta_P$, $\Theta_Y$ may be stored in the calibration database 178 and used in calibrating the ink discharge. In other implementations, only the values determined by the measurement system 176 are required, and the step at the block 194 may be omitted. Whether the block 194 is executed or omitted, control may pass to a block 196 where the print control software 174 is calibrated to compensate for the roll, pitch and yaw angles $\Theta_R$, $\Theta_P$, $\Theta_Y$ in the manner described above. For each printhead 34, 36, 38, 40, the calibration can include changing the timing of the ink discharge from the inkjet nozzles 44 as the printhead assembly 20 moves along the print route, changing the inkjet nozzles 44 from which ink is discharged to hit a target location on the 3D surface 26, or a combination thereof depending on the misalignment of the particular printhead 34, 36, 38, 40. The calibration adjustments may be stored in the calibration database 178 for use when the print control software 174 executes a printing routine for printing the pattern 14. After the calibration is performed, control may pass back to the block 182 to begin re-execution of the rotational calibration routine 180 to ensure that the calibration brings the printheads 34, 36, 38, 40 within tolerance for the application. The rotational calibration routine 180 may continue to execute iteratively in this manner until all the printheads 34, 36, 38, 40 print calibration patterns within the prescribed tolerances.

Figure 11:
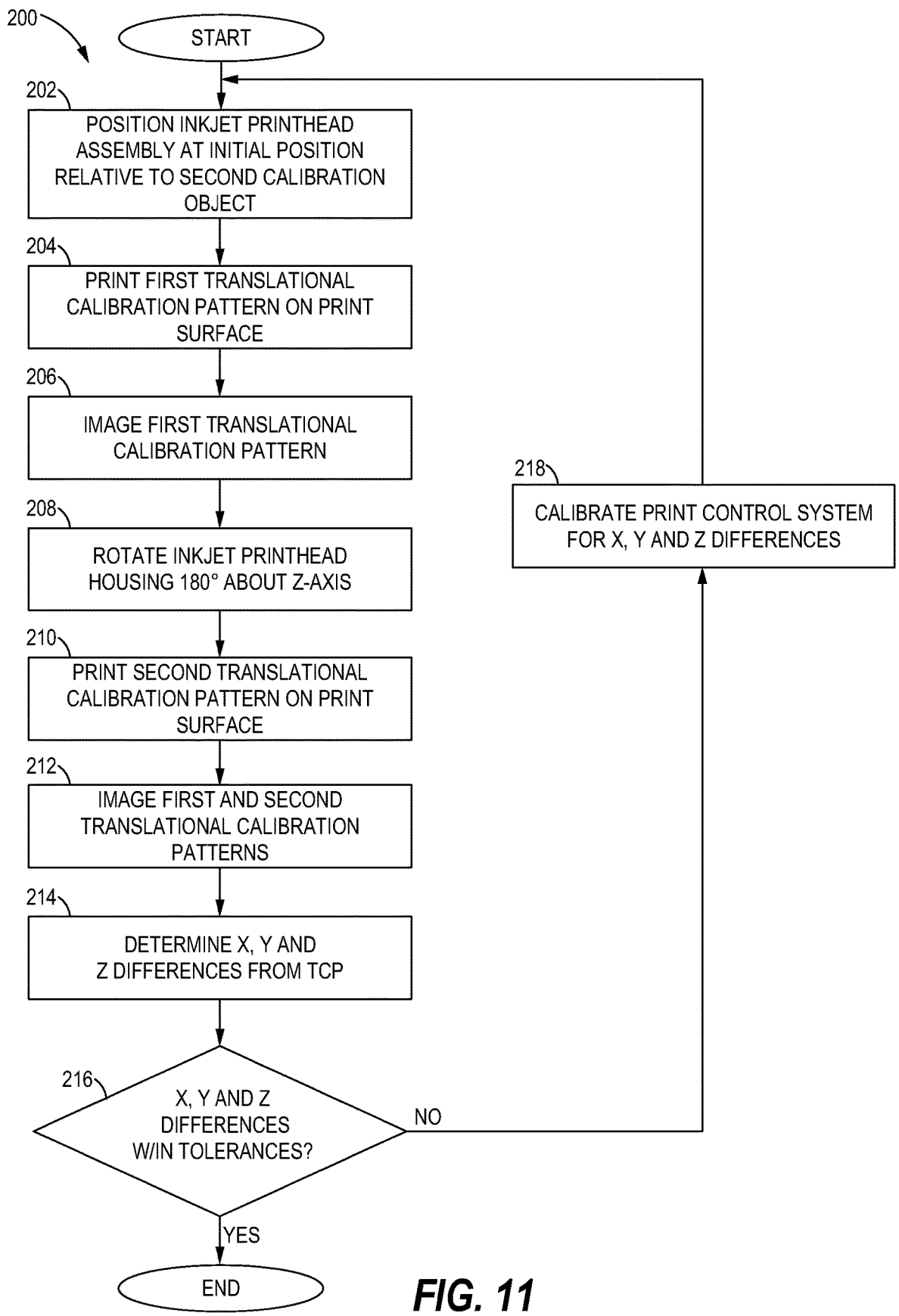
FIG. 11 is a flow diagram of a translational calibration routine for the inkjet printer system of FIG. 1.

After the print control software is calibrated to compensate for rotational misalignment of the printheads 34, 36, 38, 40, the print control software 174 may be calibrated to compensate for translational misalignment. Performing translational calibration after rotational calibration simplifies the translational calibration process, but it may be possible in alternative embodiments to perform the translational calibration first and then the rotational calibration, or to perform the calibrations simultaneously. FIG. 11 illustrates an exemplary translational calibration routine 200 that can be performed to compensate for misalignment in each of the printheads 34, 36, 38, 40 in the X, Y and Z directions relative to the TCP coordinate system 50. As with the rotational calibration routine, the translational calibration routine 200 may be programmed functionality of the print control software 174 that is executed by the controller 160. The translational calibration routine 200 may begin at a block 202 where the printhead assembly 20 is positioned at the initial position illustrated in FIG. 6 relative to the second calibration object 130 in preparation for making a printing pass over the print surface 132. The second calibration object 130 is mounted in a fixed position and the controller 160 can transmit control signals to cause the motion system 170 to move the printhead housing 24 to the prescribed initial position.

With the printhead assembly 20 in position, control may pass to a block 204 where the printhead assembly 20 moves over the second calibration object 130 and each printhead 34, 36, 38, 40 prints the first translational calibration pattern on the print surface 132. The controller 160 may transmit motion control signals to the motion system 170 and print control signals to the print control hardware 172 to move the printhead assembly 20 and cause each of the printheads 34, 36, 38, 40 to print a first translational calibration pattern, such as a crosshair printed in each corresponding print section 134, 136, 138, 140 as illustrated and described in relation to FIG. 8. After the printhead assembly 20 moves past the second calibration object 130 to the position shown in FIG. 7, control passes to a block 206 where the controller 160 transmits imaging control signals to the measurement system 176 to cause the measurement system 176 to capture an image of the first translational calibration patterns printed on the print surface 132. The captured image may be retained at the measurement system 176, and may be transmitted back to the controller 160 for storage in the calibration database 178.

Before, after or contemporaneous with capturing the image of the first translational calibration pattern, control may pass to a block 208 where the controller 160 may transmit motion commands to the motion system 170 to rotate the printhead housing 24 by 180° about the Z-axis. The rotation occurs with the motion system 170 maintaining the TCP 32 at constant positions in the Y and Z directions. With the printhead housing 24 rotated and the printhead assembly 20 in position, control may pass to a block 210 where the printhead assembly 20 moves in the reverse direction over the second calibration object 130 and each printhead 34, 36, 38, 40 prints a second translational calibration pattern on the print surface 132 in the corresponding print section 134, 136, 138, 140. As with printing the first translational calibration patterns, the controller 160 may transmit motion control signals to the motion system 170 and print control signals to the print control hardware 172 to move the printhead assembly 20 in the reverse direct and cause each of the printheads 34, 36, 38, 40 to print the second translational calibration pattern at the same target locations as the first translational calibration pattern. After the printhead assembly 20 moves past the second calibration object 130 back to the position shown in FIG. 6, control passes to a block 212 where the controller 160 transmits imaging control signals to the measurement system 176 to cause the measurement system 176 to capture an image of the first and second translational calibration patterns printed on the print surface 132.

With the images of the first and second translational calibration patterns captured, differences in the positions of the translational calibration patterns are used to determine whether adjustments to the print control software to compensate for translational misalignment are necessary to produce the pattern 14. Control may pass to a block 214 where the controller 160 transmits control signals to cause the measurement system 176 to analyze the captured images to determine X, Y and Z direction differences $\Delta_X$, $\Delta_Y$, $\Delta_Z$ between the first and second translational calibration patterns. The measurement system 176 will detect the translational calibration patterns in the images and determine differences in their positions and in their line thicknesses such as those described previously in relation to FIG. 8. The values determined by the measurement system 176 may be transmitted back to the controller 160 for evaluation and storage in the calibration database 178.

The values of the X, Y and Z direction differences $\Delta_X$, $\Delta_Y$, $\Delta_Z$ determined by the measurement system 176 are compared to corresponding tolerances at a block 216 in a similar manner as described above for the block 192 of the rotational calibration routine 180. Appropriate tolerances based on the precision required for a particular painting application may be retrieved from the calibration database 178 and used by the print control software 174 to perform the comparisons. If the values of the X, Y and Z direction differences $\Delta_X$, $\Delta_Y$, $\Delta_Z$ determined by the measurement system 176 for each of the printheads 34, 36, 38, 40 are within the corresponding tolerances for the painting application programmed into the print control software 174, the print control software 174 is sufficiently calibrated to print the pattern 14 on the 3D surface 26 and the translational calibration routine 200 terminates.

If the values of the X, Y and Z direction differences $\Delta_X$, $\Delta_Y$, $\Delta_Z$ determined by the measurement system 176 are not within the corresponding tolerances for the painting application when the comparison is made, control may pass to a block 218 where the print control software 174 is calibrated to compensate for the X, Y and Z direction differences $\Delta_X$, $\Delta_Y$, $\Delta_Z$ in the manner described above. The calibration for each printhead 34, 36, 38, 40 can include changing the ink discharge timing, changing the inkjet nozzles 44 discharging ink to hit a target location on the 3D surface 26, or a combination thereof depending on the misalignment of the particular printhead 34, 36, 38, 40. The calibration adjustments may be stored in the calibration database 178 for use when the print control software 174 executes a printing routine for printing the pattern 14. After the calibration is performed, control may pass back to the block 202 to begin re-execution of the translational calibration routine 200 to ensure that the calibration brings the printheads 34, 36, 38, 40 within tolerance for the application. The translational calibration routine 200 may continue to execute iteratively until all the printheads 34, 36, 38, 40 print translational calibration patterns within the prescribed tolerances.

The inkjet printing calibration process illustrated and described herein provides accurate calibration of the printheads 34, 36, 38, 40 relative to the TCP 32 for use in printing the pattern 14 on the 3D surface 26. The accuracy in printhead calibration is critical to achieve successful print quality of the pattern 14 by enabling accurate ink discharge from the printheads 34, 36, 38, 40 to apply the ink to the target locations on the 3D surface 26. The calibration process ties the ability to navigate the printhead assembly 20 in 3D space with the control of the timing and location of discharging ink from the inkjet nozzles 44 of the printheads 34, 36, 38, 40. Properly calibrating the inkjet printer system 12 relative to the TCP 32 of the printhead assembly 20 enables printing patterns 14 on complex 3D surface 26 with good visual quality.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A method of performing a rotational calibration of a print control system of an inkjet printer system having an inkjet printhead assembly with a first inkjet printhead, the method of performing the rotational calibration comprising:
    positioning a first calibration object at a first standoff distance from a tool center point (TCP) of the inkjet printhead assembly;
    causing the first inkjet printhead to print a first rotational calibration pattern on a first print surface of the first calibration object;
    positioning the first calibration object at a second standoff distance from the TCP of the inkjet printhead assembly;
    causing the first inkjet printhead to print a second rotational calibration pattern on the first print surface of the first calibration object;
    determining a direction difference value between the first rotational calibration pattern and the second rotational calibration pattern;
    comparing the direction difference value to a direction difference tolerance for the inkjet printhead assembly; and
    calibrating the print control system to cause the first inkjet printhead to print the first rotational calibration pattern and the second rotational calibration pattern with the direction difference value less than the direction difference tolerance in response to determining that the direction difference value is greater than the direction difference tolerance.

2. The method of performing the rotational calibration of claim 1, comprising repeating the previous steps until the direction difference value is less than the direction difference tolerance.

3. The method of performing the rotational calibration of claim 1, wherein the TCP has a TCP coordinate system having an X-axis parallel to a print direction that the inkjet printhead assembly moves when printing a pattern on a component, a Z-axis perpendicular to the X-axis in an ink discharge direction from the first inkjet printhead, and a Y-axis perpendicular to the X-axis and the Z-axis.

4. The method of performing the rotational calibration of claim 3, wherein the direction difference value indicates an X direction distance between the first rotational calibration pattern and the second rotational calibration pattern and a yaw angle of rotation of the first inkjet printhead about a printhead axis parallel to the Y-axis, and wherein calibrating the print control system comprises:
    causing the first inkjet printhead to delay discharging ink when moving in the print direction and printing the pattern on the component in response to determining that the second rotational calibration pattern is misaligned from the first rotational calibration pattern away from the print direction; and
    causing the first inkjet printhead to discharge ink earlier when moving in the print direction and printing the pattern on the component in response to determining that the second rotational calibration pattern is misaligned from the first rotational calibration pattern toward the print direction.

5. The method of performing the rotational calibration of claim 3, wherein the first inkjet printhead has a plurality of inkjet nozzles arranged in a plurality of inkjet nozzle columns that are parallel to the Y-axis, wherein the direction difference value indicates an X direction distance between the first rotational calibration pattern and the second rotational calibration pattern and a yaw angle of rotation of the first inkjet printhead about a printhead axis parallel to the Y-axis, and wherein calibrating the print control system comprises:
    causing the first inkjet printhead to discharge ink from vertical columns toward the print direction when moving in the print direction and printing the pattern on the component in response to determining that the second rotational calibration pattern is misaligned from the first rotational calibration pattern away from the print direction; and
    causing the first inkjet printhead to discharge ink from vertical columns away from the print direction when moving in the print direction and printing the pattern on the component in response to determining that the second rotational calibration pattern is misaligned from the first rotational calibration pattern toward the print direction.

6. The method of performing the rotational calibration of claim 3, wherein the direction difference value indicates a roll angle of rotation of the first inkjet printhead about a printhead axis parallel to the Z-axis, and wherein calibrating the print control system comprises:
    causing the first inkjet printhead to print the first rotational calibration pattern and the second rotational calibration pattern rotated in a clockwise direction by a clockwise adjustment amount equal to the direction difference value in response to determining that the first rotational calibration pattern and the second rotational calibration pattern have a counterclockwise roll angle; and
    causing the first inkjet printhead to print the first rotational calibration pattern and the second rotational calibration pattern rotated in a counterclockwise direction by a counterclockwise adjustment amount equal to the direction difference value in response to determining that the first rotational calibration pattern and the second rotational calibration pattern have a clockwise roll angle.

7. The method of performing the rotational calibration of claim 1, comprising after repeating the previous steps until the direction difference value is less than the direction difference tolerance:
    positioning the inkjet printhead assembly at an initial position relative to a second calibration object;
    causing the first inkjet printhead to print a first translational calibration pattern on a second print surface of the second calibration object;
    rotating the inkjet printhead assembly 180° about the TCP;

causing the first inkjet printhead to print a second translational calibration pattern on the second print surface of the second calibration object;

determining the direction difference value between the first translational calibration pattern and the second translational calibration pattern;

comparing the direction difference value to the direction difference tolerance for the inkjet printhead assembly; and calibrating the print control system to cause the first inkjet printhead to print the first translational calibration pattern and the second translational calibration pattern with the direction difference value less than the direction difference tolerance in response to determining that the direction difference value is greater than the direction difference tolerance.

8. An inkjet printer system capable of performing a rotational calibration for accurately printing patterns on surfaces, the inkjet printer system comprising:

an inkjet printhead assembly having an inkjet printhead housing with a first inkjet printhead mounted thereto and a tool center point (TCP);

a motion system operatively connected to the inkjet printhead assembly and actuatable to move the inkjet printhead assembly;

a print control system operatively connected to the inkjet printhead assembly and actuatable to cause the first inkjet printhead to discharge ink;

a measurement system; and a controller operatively connected to the motion system, the print control system and the measurement system, the controller being programmed to:

actuate the print control system to cause the first inkjet printhead to print a first rotational calibration pattern on a first print surface of a first calibration object disposed at a first standoff distance from the TCP, actuate the print control system to cause the first inkjet printhead to print a second rotational calibration pattern on the first print surface of the first calibration object when the first calibration object is disposed at a second standoff distance from the TCP, actuate the measurement system to determine a first direction difference value between the first rotational calibration pattern and the second rotational calibration pattern, and to compare the first direction difference value to a direction difference tolerance for the inkjet printhead assembly; and calibrate the print control system to cause the first inkjet printhead to print the first rotational calibration pattern and the second rotational calibration pattern with the first direction difference value less than the direction difference tolerance in response to determining that the first direction difference value is greater than the direction difference tolerance.

9. The inkjet printer system of claim 8, wherein the controller is programmed to repeat the previous steps until the first direction difference value is less than the direction difference tolerance.

10. The inkjet printer system of claim 8, wherein the controller is programmed to actuate the motion system to position the inkjet printhead assembly at the first standoff distance from the first calibration object prior to printing the first rotational calibration pattern, and to actuate the motion system to position the inkjet printhead assembly at the second standoff distance from the first calibration object prior to printing the second rotational calibration pattern.

11. The inkjet printer system of claim 8, wherein the first inkjet printhead discharges a first color ink, wherein the inkjet printhead assembly has a second inkjet printhead that discharges a second color ink, and wherein the controller is programmed to:

actuate the print control system to cause the second inkjet printhead to print the first rotational calibration pattern with the second color ink on the first print surface of the first calibration object when the first calibration object disposed at the first standoff distance;

actuate the print control system to cause the second inkjet printhead to print the second rotational calibration pattern with the second color ink on the first print surface of the first calibration object when the first calibration object disposed at the second standoff distance;

actuate the measurement system to determine a second direction difference value between the first rotational calibration pattern printed in the second color ink and the second rotational calibration pattern printed in the second color ink, and to compare the second direction difference value to the direction difference tolerance for the inkjet printhead assembly; and calibrate the print control system to cause the second inkjet printhead to print the first rotational calibration pattern in the second color ink and the second rotational calibration pattern in the second color ink with the second direction difference value less than the direction difference tolerance in response to determining that the second direction difference value is greater than the direction difference tolerance.

12. The inkjet printer system of claim 11, wherein the controller is programmed to repeat the previous steps until the first direction difference value is less than the direction difference tolerance and the second direction difference value is less than the direction difference tolerance.

13. The inkjet printer system of claim 8, wherein the controller is programmed to:

repeat the previous steps until the first direction difference value is less than the direction difference tolerance;

actuate the motion system to position the inkjet printhead assembly at an initial position relative to a second calibration object;

actuating the print control system to cause the first inkjet printhead to print a first translational calibration pattern on a second print surface of the second calibration object;

actuate the motion system to rotate the inkjet printhead assembly 180° about the TCP;

actuating the print control system to cause the first inkjet printhead to print a second translational calibration pattern on the second print surface of the second calibration object;

actuating the measurement system to determine the first direction difference value between the first translational calibration pattern and the second translational calibration pattern, and to compare the first direction difference value to the direction difference tolerance for the inkjet printhead assembly; and calibrate the print control system to cause the first inkjet printhead to print the first translational calibration pattern and the second translational calibration pattern with the first direction difference value less than the direction difference tolerance in response to determining that the first direction difference value is greater than the direction difference tolerance.

14. A method of performing a translational calibration of a print control system of an inkjet printer system having an inkjet printhead assembly with a first inkjet printhead, the method of performing the translational calibration comprising:
- positioning a tool center point (TCP) of the inkjet printhead assembly at an initial position relative to a calibration object;
- causing the first inkjet printhead to print a first translational calibration pattern on a print surface of the calibration object;
- rotating the inkjet printhead assembly 180° about the TCP;
- causing the first inkjet printhead to print a second translational calibration pattern on the print surface of the calibration object;
- determining a first direction difference value between the first translational calibration pattern and the second translational calibration pattern printed by the first inkjet printhead;
- comparing the first direction difference value to a direction difference tolerance for the inkjet printhead assembly; and
- calibrating the print control system to cause the first inkjet printhead to print the first translational calibration pattern and the second translational calibration pattern with the first direction difference value less than the direction difference tolerance in response to determining that the first direction difference value is greater than the direction difference tolerance.

15. The method of performing the translational calibration of claim 14, comprising repeating the previous steps until the first direction difference value is less than the direction difference tolerance.

16. The method of performing the translational calibration of claim 14, comprising:
- generating a first calibration image of the first translational calibration pattern after printing the first translational calibration pattern and before printing the second translational calibration pattern;
- generating a second calibration image of the first translational calibration pattern and the second translational calibration pattern after printing the second translational calibration pattern; and
- determining the first direction difference value by comparing the first calibration image and the second calibration image.

17. The method of performing the translational calibration of claim 14, wherein causing the first inkjet printhead to print the first translational calibration pattern comprises causing the inkjet printhead assembly to move in a forward print direction past the calibration object, and causing the first inkjet printhead to discharge ink onto the print surface as the inkjet printhead assembly passes over the calibration object in the forward print direction, and wherein causing the first inkjet printhead to print the second translational calibration pattern comprises causing the inkjet printhead assembly to move in a reverse print direction that is opposite the forward print direction past the calibration object, and causing the first inkjet printhead to discharge ink onto the print surface as the inkjet printhead assembly passes over the calibration object in the reverse print direction.

18. The method of performing the translational calibration of claim 14, wherein the first inkjet printhead discharges a first color ink, wherein the inkjet printhead assembly has a second inkjet printhead that discharges a second color ink, and wherein the method of performing the translational calibration comprises:
- causing the second inkjet printhead to print the first translational calibration pattern with the second color ink on the print surface of the calibration object;
- causing the second inkjet printhead to print the second translational calibration pattern with the second color ink on the print surface of the calibration object;
- determining a second direction difference value between the first translational calibration pattern printed in the second color ink and the second translational calibration pattern printed in the second color ink;
- comparing the second direction difference value to the direction difference tolerance for the inkjet printhead assembly; and
- calibrating the print control system to cause the second inkjet printhead to print the first translational calibration pattern in the second color ink and the second translational calibration pattern in the second color ink with the second direction difference value less than the direction difference tolerance in response to determining that the second direction difference value is greater than the direction difference tolerance.

19. The method of performing the translational calibration of claim 18, comprising repeating the previous steps until the first direction difference value is less than the direction difference tolerance and the second direction difference value is less than the direction difference tolerance.

20. The method of performing the translational calibration of claim 14, comprising performing a rotational calibration of the inkjet printhead assembly before performing the previous steps.

* * * * *